United States Patent [19]

Veneziano

[11] 4,366,465

[45] Dec. 28, 1982

[54] FALSE FAILURE DETECTION PREVENTION IN AN AIR BAG DIAGNOSTIC SYSTEM

[75] Inventor: Marcello Veneziano, Novi, Mich.

[73] Assignee: Ford Motor Company, Dearborn, Mich.

[21] Appl. No.: 307,836

[22] Filed: Oct. 2, 1981

[51] Int. Cl.³ .............................................. B60R 21/00
[52] U.S. Cl. ................................ 340/52 R; 340/52 H;
340/61; 180/271; 307/10 R
[58] Field of Search ................. 340/52 R, 52 E, 52 F,
340/52 H, 53, 61; 180/271, 274; 307/10 R

[56] References Cited

U.S. PATENT DOCUMENTS 4,016,426  4/1977  Nishioka ........................... 307/10 R Primary Examiner—Alvin H. Waring
Attorney, Agent, or Firm—Paul K. Godwin, Jr.; Clifford L. Sadler

[57] ABSTRACT

A device for preventing any false disarming signal from reaching a firing circuit disarming device in an air bag inflation system. Disarming signals must coincide with the completion of a short-to-ground path through one of the crash sensors before the firing circuit is disarmed.

5 Claims, 1 Drawing Figure

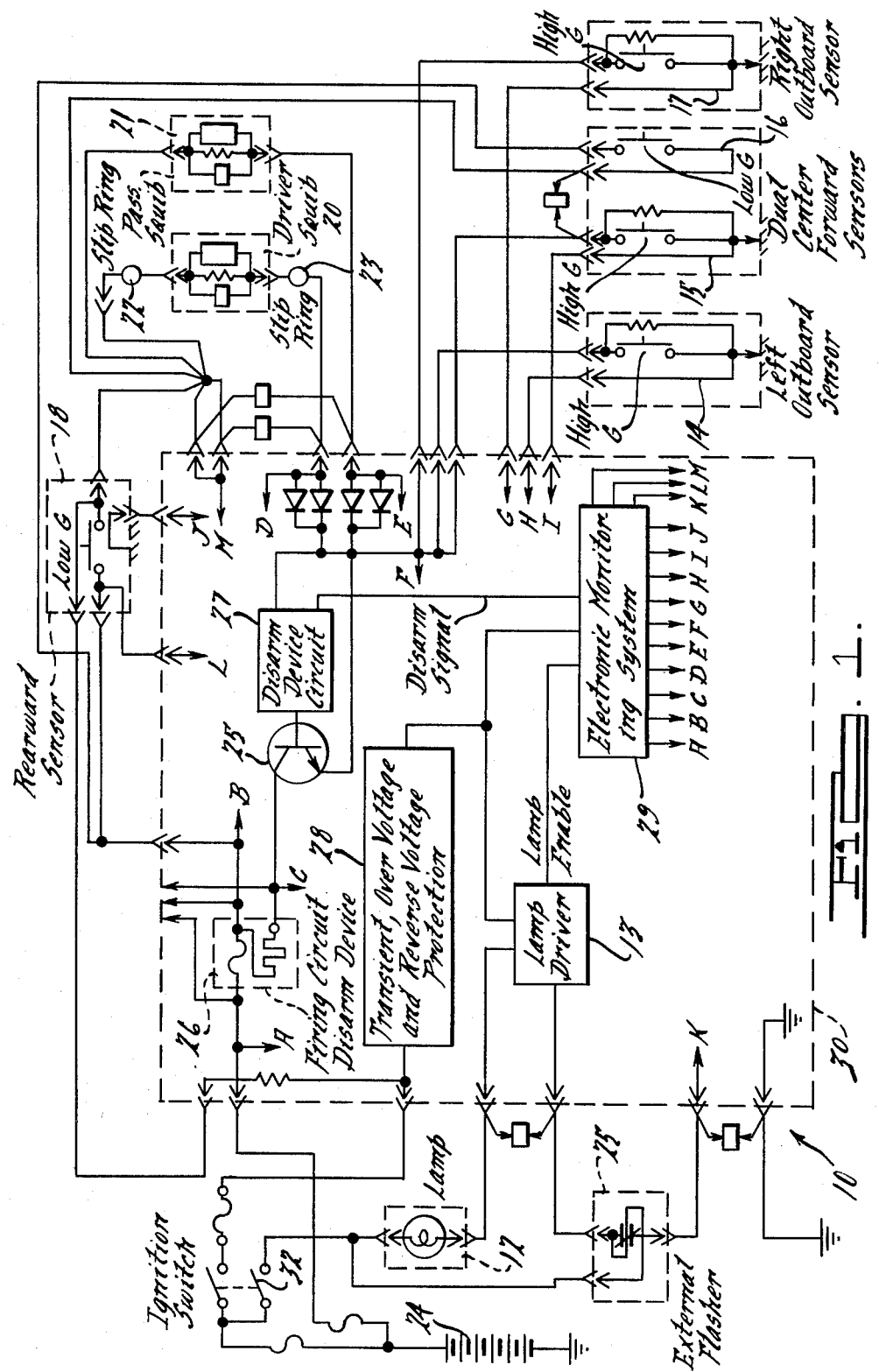

FALSE FAILURE DETECTION PREVENTION IN AN AIR BAG DIAGNOSTIC SYSTEM

RELATED APPLICATIONS

This invention is related to commonly assigned U.S. application Ser. No. 219,174, filed Dec. 22, 1980.

BACKGROUND OF THE INVENTION

1. Field of the Invention

The present invention relates to an improved fault detection system for an automotive air bag system.

2. Description of the Prior Art

During the testing of air bag systems, such as that disclosed in the above-reference related application, it was found that from time to time, the electronic monitoring systems employed therein would malfunction and produce false indications of failures occurring in the system. When such false indications are related to shorting of front mounted high "G" deceleration sensors, the conventional systems will disarm a firing circuit for the air bag inflation devices. System disarming due to false or erroneous sensing of shorts in the high "G" deceleration sensors is not acceptable, since only the monitoring system is at fault, rather than the air bag inflation system.

SUMMARY OF THE INVENTION

The present invention is intended to overcome the problems encountered in prior art air bag monitoring systems by providing means for preventing any disarming signal from reaching the firing circuit disarming device until such time as that disarming signal is verified as being derived due to an actual short-to-ground circuit being completed across any of the high "G" deceleration sensors.

The present invention provides an AND gate function to any disarm signal generated by the monitoring system by requiring a concurrent occurrence of a short-to-ground path through any of the high "G" deceleration sensors and thereby increases the reliability of the overall air bag system.

BRIEF DESCRIPTION OF THE DRAWING

FIG. 1 is a schematic drawing of an air bag system, similar to that shown in the aforementioned related application, employing the present invention.

DETAILED DESCRIPTION OF THE INVENTION

Referring to the Figure, a vehicle air bag system 10 utilizes two air bags. One air bag is located in the steering wheel hub coupled to a driver side igniter or squib 20, while the other is in the instrument panel, in front of the passenger seats, coupled to a squib 21. Impact sensing is accomplished through the use of high-"G"-level forward mounted crash (deceleration) sensing elements 14, 15 and 17 and two low-"G"-level sensing elements 16 and 18, which are responsive to lower deceleration forces than the high-"G"-level sensors. Air bag system 10 further includes a diagnostic module 30; a battery 24; an indicator warning lamp 12; and an external flasher 25. Diagnostic module 30 includes a central electronic monitoring system 29; a lamp driver system 13; a firing circuit disarm device 26; a disarm prevention means 25; a disarm device circuit 27; and a voltage protection circuit 28.

The air bag system 10 performs the following three functions: detecting a crash; switching electric power to air bag squibs; and monitoring the system to determine readiness.

More particularly, squibs 20 and 21 are electrical igniting devices that initiate the inflater deployment process for both the driver and passenger air bags. To perform this function, the squibs convert an electrical input to thermal energy, provide sufficient ballistics to ignite a booster charge, and attenuate extraneous signals coming from sources such as radio and television transmitters. Slip ring assemblies 22 and 23 are coupled to each side of driver squib 20 and transfer air bag electrical signals from the steering column to the steering wheel.

The high-"G"-level crash sensing elements in the forward mounted crash sensor assemblies (left 14; center 15; and right 17) supply an early response to severe head-on, or off-center impacts. All three forward mounted sensor assemblies are located in the engine compartment. The high-"G"-level sensing elements are all connected in parallel on the low voltage or ground side of the squib circuit. As a result, any one of the high-"G"-level crash sensing elements can provide a ground path for the deployment circuit.

Low-"G"-level sensing elements (center forward 16; and rearward 18) are connected in parallel on the high voltage side of the squib circuit. Either one of the low-"G"-level sensing elements can provide a high voltage path for the deployment circuit. Since there are sensors on both the ground side and the high voltage side of the squibs, one of each type has to be closed before the squibs are energized.

All three forward high-"G"-level crash sensor assemblies are locally grounded to the vehicle. The high-"G"-level sensing elements 14, 15 and 17 employ this local ground connection to complete the deployment circuit on the low side of the squibs. As a result, a loose forward sensor assembly is capable of disarming itself. The rearward sensor assembly is also locally grounded to the vehicle.

Ground and circuit connector attachments of all of the sensor assemblies are monitored through a circuit routed from each sensor assembly to diagnostic module 30. If the vehicle ground connection of any one of the sensors becomes open circuited, indicator lamp 12 is flashed continuously by the lamp driver 13 under the control of electronic monitoring system 29. To achieve the monitoring function, a small diagnostic current is passed through an ignition switch 32; the low and high-"G"-level sensors; the squibs 20 and 21; and module 30 connector contacts. The voltages, due to the flow of diagnostic current, are measured by the electronic monitoring system 29 at several points in the circuit to detect open connections or shorts to ground. When the diagnostic module detects an unacceptable voltage change and determines where this change has taken place, diagnositc module 30 generates a fault code to be displayed by indicator lamp 12.

In the event the air bag diagnostic module is disconnected from the wiring assembly, shorting terminals in the diagnostic module connector cause energization of the external flasher 25, which causes the indicator lamp 12 to flash continuously.

Firing disarm device 26 protects against inadvertent deployment due to shorts to ground in the high-"G"-level crash sensor deployment circuits. If shorts occur for approximately more than fifteen seconds, the deployment circuit is permanently opened and the warning lamp is caused to flash until the fault is corrected. Firing diarm device 26 is typically a fuse which is opened by a current which is applied only when transistor 25 is biased on and a short is actually present in one of the sensor circuits. Transistor 25 is biased on by disarm device circuit 27 receiving a disarm signal from the electronic monitoring system 29. Therefore, the transistor 25 serves to prevent erroneous disarming of the firing circuit, in the event a malfunction occurs in the electronics of the monitoring system and no short is actually present.

The power source for the air bag diagnostic circuit is applied only when the ignition key is in the run mode. Power for the air bag deployment circuit is derived from a direct battery connection. The deployment circuit is protected by a fusible link in the engine compartment.

External flasher 25 is connected in series with indicator lamp 12 and activates lamp 12 on and off when the connector for diagnostic module 30 is disengaged from air bag system 10. Shorting contact terminals are used to complete the current path to ground when the connector becomes disengaged. With the connector normally engaged by the diagnostic module 30, the shorting contact terminals are open circuited with respect to each other.

Various modifications and variations will no doubt occur to those skilled in the various arts to which this invention pertains. Variations which basically rely on the teachings through which this disclosure has advanced the art are properly considered within the scope of this invention.

I claim:

1. In an air bag restraint deployment system for an automotive vehicle including:

a plurality of crash sensors mounted in the front of the vehicle, each having an electrical configuration of a normally open switch and being connected in parallel;

a deceleration sensor mounted towards the rear of the vehicle and having the electrical configuration of a normally open switch;

means connected in series between said crash sensors and said deceleration sensor for inflating said air bag in response to the concurrent closing of both said sensors;

circuit means for supplying a system voltage across said interconnected deceleration sensor, inflation means and crash sensor;

means for disarming said system by interrupting the circuit means and inhibiting said supply of system voltage across said deceleration sensor, inflation means and said crash sensor;

means connected to said deceleration sensor, said crash sensors, said inflation means, and said disarming means, for monitoring their operating condition, for providing an indication when an operating condition is impaired, and for providing a disarmed signal to said disarming means when a short is detected across any of said crash sensors;

an improvement comprising:

means connected to a junction between said crash sensors and said inflation means, and to said disarming means to receive said disarm signal, and for responsively activating said disarming means only when a short is present across any of said crash sensors.

2. An improved system as in claim 1, wherein said disarming means includes a fuzible link connected between said system voltage supplying means and said deceleration sensor and a heater element that, when activated, causes said fuzible link to open after a predetermined period of time.

3. An improved system as in claim 2, wherein said disarming signal receiving means is also connected to said heater element, said heater element has one of two terminals connected to the connection between said fuzible link and said deceleration sensor and the other terminal connected to said disarming signal receiving means.

4. An improved system as in claim 3, wherein said disarming signal receiving means includes a transistor biased to provide a normally high impedance collector to emitter path in the absence of a disarming signal and a low impedance collector to emitter path when said disarming signal is received and said other terminal of said heater element is connected in series with the collector to emitter path of said transistor.

5. An improved system as in claim 2, wherein said collector to emitter path of said transistor is connected in a series between said heater element and said plurality of crash sensors.

* * * * *